United States Patent
Chen et al.

(10) Patent No.: US 9,686,103 B2
(45) Date of Patent: Jun. 20, 2017

(54) METHOD FOR COMPENSATING THE FREQUENCY DEPENDENT PHASE IMBALANCE

(71) Applicant: MEDIATEK Inc., Hsin-Chu (TW)

(72) Inventors: Kuo-Hao Chen, Hsinchu (TW);
Chun-Hao Liao, Taichung (TW);
Pei-Shiun Chung, New Taipei (TW);
Hsin-Hung Chen, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 443 days.

(21) Appl. No.: 13/795,130

(22) Filed: Mar. 12, 2013

(65) Prior Publication Data
US 2013/0287082 A1 Oct. 31, 2013

Related U.S. Application Data

(60) Provisional application No. 61/639,600, filed on Apr. 27, 2012.

(51) Int. Cl.
*H04L 25/03* (2006.01)
*H04L 7/00* (2006.01)
(Continued)

(52) U.S. Cl.
CPC ............ *H04L 25/03* (2013.01); *H04L 7/0037* (2013.01); *H04L 27/364* (2013.01); *H04L 27/3863* (2013.01)

(58) Field of Classification Search
USPC ......................................... 375/295, 296, 346
See application file for complete search history.

(56) References Cited

U.S. PATENT DOCUMENTS 5,774,375 A 6/1998 Behrent
5,949,821 A 9/1999 Emami et al.
(Continued)

OTHER PUBLICATIONS

Valkama, et al.: "Compensation of Frequency-Selective I/Q Imbalances in Wideband Receivers: Models and Algorithms"; Copyright 2001; pp. 42-45.
(Continued)

*Primary Examiner* — Kabir A Timory
(74) *Attorney, Agent, or Firm* — McClure, Qualey & Rodack, LLP

(57) ABSTRACT

A method for compensating the frequency dependent phase imbalance in a receiver is provided. The receiver downconverts an input signal to generate the signal r(t). The signal r(t) has an in-phase component $r_I(t)$ and a quadrature component $r_Q(t)$. A first test signal with a first carrier frequency is applied as the input signal of the receiver to obtain a first phase imbalance I. A second test signal with a second carrier frequency is applying as the input signal of the receiver to obtain a second phase imbalance. An IQ delay mismatch $\Delta t$ of the receiver according to the difference of the second and the first phase imbalances and the difference of the second and the first carrier frequencies is obtained. The in-phase component $r_I(t)$ and the quadrature component $r_Q(t)$ of the signal r(t) corresponding to other input signal is compensated according to the obtained IQ delay mismatch $\Delta t$.

10 Claims, 5 Drawing Sheets

(51) Int. Cl.
   *H04L 27/38*    (2006.01)
   *H04L 27/36*    (2006.01)

(56) References Cited

U.S. PATENT DOCUMENTS

| | | |
|---|---|---|
| 6,034,564 A | 3/2000 | Iwamatsu |
| 6,054,896 A | 4/2000 | Wright et al. |
| 7,570,923 B2 | 8/2009 | Kiss et al. |
| 7,856,050 B1 | 12/2010 | Wiss et al. |
| 2003/0165203 A1 | 9/2003 | Mohindra |
| 2005/0008107 A1 | 1/2005 | Brown |
| 2006/0063497 A1 | 3/2006 | Nielsen |
| 2007/0058755 A1* | 3/2007 | Husted ............ 375/332 |
| 2010/0008449 A1 | 1/2010 | Sayers |
| 2011/0222631 A1* | 9/2011 | Jong ............ 375/316 |
| 2012/0230372 A1* | 9/2012 | Park et al. ............ 375/148 |

OTHER PUBLICATIONS

Lu, et al.: "Joint Transmitter and Receiver IQ Imbalance Estimation and Compensation for OFDM Systems"; © 2010; pp. 476-479.
Valkama, et al: "Advanced Methods for I/Q Imbalance Compensation in Communication Receivers"; IEEE Transactions on Signal Processing, vol. 49, No. 10, Oct. 2001; pp. 2335-2344.
CN Office Action dated Dec. 10, 2014.
Non-Final Office Action issued for U.S. Appl. No. 14/309,925, filed Jun. 20, 2014, mailed Feb. 18, 2015.

\* cited by examiner

METHOD FOR COMPENSATING THE FREQUENCY DEPENDENT PHASE IMBALANCE

This application claims the benefit of U.S. provisional application Ser. No. 61/639,600, filed Apr. 27, 2012, the subject matter of which is incorporated herein by reference.

BACKGROUND OF THE INVENTION

Field of the Invention

The invention relates in general to a method for compensating the frequency dependent phase imbalance, and more particularly to a method for compensating the frequency dependent phase imbalance in a receiver or a transmitter.

Description of the Related Art

Radio frequency (RF) system is widely adopted in wireless communication. Although RF system has the advantages of low cost and low power consumption, one of its main problems is IQ imbalance. Part of the IQ imbalance results from the mismatch of amplitudes between in-phase (I) and quadrature (Q) paths and local oscillators, and the phase shift is not exactly 90 degrees. The mismatches of amplitude and phase shift are called gain and phase imbalance. Since the IQ imbalance degrades the system performance considerably, it is a critical issue as how to provide a method for the RF system to compensate the IQ imbalance and improve the system performance.

SUMMARY OF THE INVENTION

According to an aspect of the present invention, a method for compensating the frequency dependent phase imbalance in a receiver is provided. The receiver downconverts an input signal to generate a signal r(t). The signal r(t) has an in-phase component $r_I(t)$ and a quadrature component $r_Q(t)$. The method includes the following steps. A first test signal with a first carrier frequency is applied as the input signal of the receiver to obtain a first phase imbalance between the in-phase component and the quadrature component of the signal r(t) corresponding to the first test signal. A second test signal with a second carrier frequency is applied as the input signal of the receiver to obtain a second phase imbalance between the in-phase component and the quadrature component of the signal r(t) corresponding to the second test signal. An IQ delay mismatch Δt of the receiver according to the difference of the second phase imbalance and the first phase imbalance and the difference of the second carrier frequency and the first carrier frequency is obtained. The in-phase component $r_I(t)$ and the quadrature component $r_Q(t)$ of the signal r(t) corresponding to other input signal is compensated according to the obtained IQ delay mismatch Δt.

According to another aspect of the present invention, a method for compensating the frequency dependent phase imbalance in a transmitter is provided. The transmitter processes a baseband signal x(t). The baseband signal x(t) has a first component $x_I(t)$ and a second component $x_Q(t)$ which have angular frequency $\omega_B$. The method includes the following steps: (a) compensating the baseband signal x(t) with a predetermined delay amounts τ; (b) inputting the compensated baseband signal to an upconversion circuit to generate a radio frequency (RF) signal y(t); (c) inputting the RF signal y(t) to a delay information extractor to obtain a correlation value related to the information of the predetermined delay amount τ; (d) changing the predetermined delay amount τ and compensating the baseband signal x(t) again with the changed predetermined delay amount τ, and performing steps (b) and (c) again to update the correlation value; and (e) selecting a candidate delay amount (e.g., the closest delay amount) from the predetermined delay amount according to the correlation value, and compensating the transmitter by using the candidate delay amount.

The above and other aspects of the invention will become better understood with regard to the following detailed description of the preferred but non-limiting embodiments. The following description is made with reference to the accompanying drawings.

DETAILED DESCRIPTION OF THE INVENTION

The First Embodiment

Figure 1:
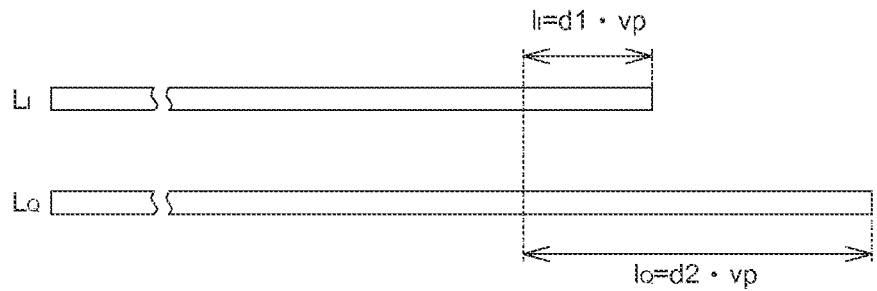
FIG. 1 illustrates the length difference of the transmission line $L_I$ for in-phase signal and the transmission line $L_Q$ for quadrature signal are $I_Q-I_I$.

In practical receivers or transmitters, the IQ imbalance is frequency dependent, especially in the RF system with wide signal bandwidth. Part of the IQ imbalance results from that the length of transmission lines for the in-phase signal and the quadrature signal are different. As shown in FIG. 1, assume the length difference of the transmission line $L_I$ for in-phase signal and the transmission line $L_Q$ for quadrature signal are $I_Q-I_I$, that is $(d_2-d_1) \cdot v_p$, $d_1$ and $d_2$ are transmission delay time for the in-phase signal and the quadrature signal, respectively, and $v_p$ is the signal transmission velocity in the transmission lines. Frequency dependent phase imbalance φ satisfies the following equations:

$$\frac{(d_2 - d_1) \cdot v_p}{\lambda} = \frac{\phi}{360°}$$

$$\phi = 360° \cdot \frac{(d_2 - d_1) \cdot v_p}{\lambda}$$

$$\phi = 360° \cdot (d_2 - d_1) \cdot f_B$$

where λ is the wavelength of the signal, and $f_B$ is the carrier frequency of the signal.

In practical receiver, the value of $d_2-d_1$ (i.e., IQ delay mismatch $\Delta t$) is unknown. According to one embodiment of the invention, a method for compensating the frequency dependent phase imbalance in a receiver is provided to find out the value of $d_2-d_1$ first, and then the receiver is compensated according to the obtained value of $d_2-d_1$.

Figure 2:
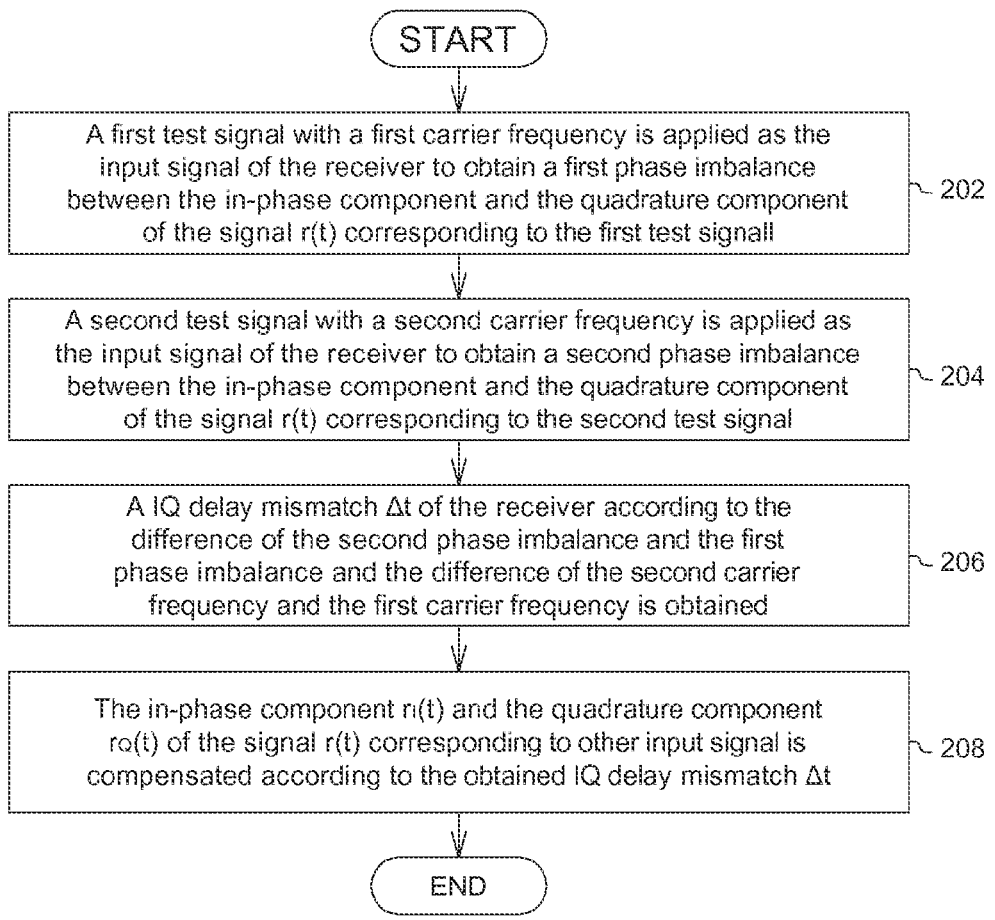
FIG. 2 is the flow chart illustrating a method for compensating the frequency dependent phase imbalance in a receiver according to one embodiment of the invention.

A method for compensating the frequency dependent phase imbalance in a receiver according to one embodiment of the invention is described below. The receiver downconverts an input signal to generate the signal r(t). The signal r(t) has an in-phase component $r_I(t)$ and a quadrature component $r_Q(t)$. The method includes the following steps shown in FIG. 2. In step 202, a first test signal with a first carrier frequency is applied as the input signal of the receiver to obtain a first phase imbalance between the in-phase component and the quadrature component of the signal r(t) corresponding to the first test signal. In step 204, a second test signal with a second carrier frequency is applied as the input signal of the receiver to obtain a second phase imbalance between the in-phase component and the quadrature component of the signal r(t) corresponding to the second test signal. After that, step 206 is entered, and a IQ delay mismatch $\Delta t$ of the receiver according to the difference of the second phase imbalance and the first phase imbalance and the difference of the second carrier frequency and the first carrier frequency is obtained. Then, step 208 is performed, and the in-phase component $r_I(t)$ and the quadrature component $r_Q(t)$ of the signal r(t) corresponding to other input signal are compensated according to the obtained IQ delay mismatch $\Delta t$.

Figure 3:
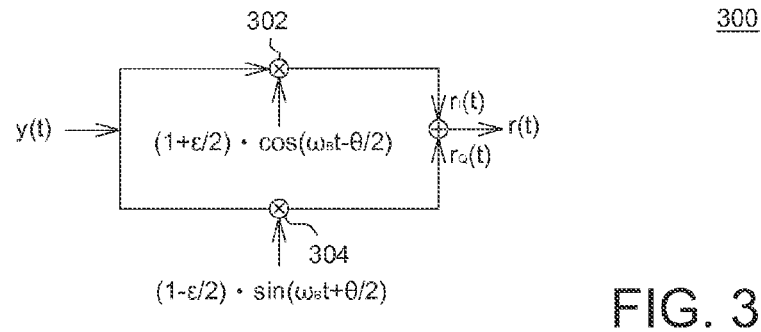
FIG. 3 shows a block diagram of a simplified receiver used for explaining this example of the embodiment.

The method is further explained with one example below. Referring to FIG. 3, a block diagram of a simplified receiver used for explaining this example of the embodiment is shown. Signal y(t) is inputted to the receiver 300, and signal y(t) is downconverted by mixers 302 and 304 to generate signal r(t), wherein signal $r(t)=r_I(t)+jr_Q(t)$, $r_I(t)$ is the in-phase component of r(t), and $r_Q(t)$ is the quadrature component of r(t). The signal r(t) is, for example, a baseband signal. The $r_I(t)$ and $r_Q(t)$ can be represented as:

$$\begin{bmatrix} r_I(t) \\ r_Q(t) \end{bmatrix} = \begin{bmatrix} A\left(1+\frac{\varepsilon}{2}\right)\cos\left(\omega_B(t+d_1)-\frac{\theta}{2}\right) \\ A\left(1-\frac{\varepsilon}{2}\right)\sin\left(\omega_B(t+d_2)+\frac{\theta}{2}\right) \end{bmatrix}$$

$$= \begin{bmatrix} A\left(1+\frac{\varepsilon}{2}\right)\cos\left(\omega_B t + \left(\omega_B d_1 - \frac{\theta}{2}\right)\right) \\ A\left(1-\frac{\varepsilon}{2}\right)\sin\left(\omega_B t + \left(\omega_B d_2 + \frac{\theta}{2}\right)\right) \end{bmatrix}$$

A is the amplitude, $\varepsilon$ is gain imbalance, $\theta$ is phase imbalance, and $\omega_B$ is the angular frequency of carrier. Assume the gain balance $\varepsilon$ is zero, then frequency dependent phase imbalance $\phi$ is:

$$\phi = \text{phase}\left\{\sin\left(\omega_B t + \left(\omega_B d_2 + \frac{\theta}{2}\right)\right)\right\} - \text{phase}\left\{\cos\left(\omega_B t + \left(\omega_B d_1 - \frac{\theta}{2}\right)\right)\right\} -$$

$$\{\text{phase}(\sin(\omega_B t)) - \text{phase}(\cos(\omega_B t))\} \sim$$

$$\frac{-\pi}{2} + \theta + \omega_B \cdot (d_2 - d_1) - \frac{-\pi}{2} = \theta + 2\pi f_B \cdot \Delta t$$

In step 202, a first test signal $y_1(t)$ with a first carrier frequency $f_{B1}$ is applied as the input signal of the receiver 300 to obtain a first phase imbalance $\phi_1$ between the in-phase component $r_{I1}(t)$ and the quadrature component $r_{Q1}(t)$ of the signal $r_1(t)$ corresponding to the first test signal $y_1(t)$. The first phase imbalance $\phi_1$ can be obtained as $$\phi_1 = \theta + 2\pi \cdot \Delta t \cdot f_{B1} = \theta + 360° \cdot \Delta t \cdot f_{B1}$$

In step 204, a second test signal $y_2(t)$ with a second carrier frequency $f_{B2}$ is applied as the input signal of the receiver 300 to obtain a second phase imbalance $\phi_2$ between the in-phase component $r_{I2}(t)$ and the quadrature component $r_{Q2}(t)$ of the signal $r_2(t)$ corresponding to the second test signal $y_2(t)$. The second phase imbalance $\phi_2$ can be obtained as $$\phi_2 = \theta + 360° \cdot \Delta t \cdot f_{B2}$$

In step 206, a IQ delay mismatch $\Delta t$ of the receiver 300 according to the difference of the second phase imbalance and the first phase imbalance $\phi 2-\phi 1$ and the difference of the second carrier frequency and the first carrier frequency $f_{B2}-f_{B1}$ is obtained by $$\phi_2 - \phi_1 = 360° \cdot \Delta t \cdot (f_{B2} - f_{B1})$$

$$\Delta t = d_2 - d_1 = \frac{\phi_2 - \phi_1}{360° \cdot (f_{B2} - f_{B1})}$$

Figure 4:
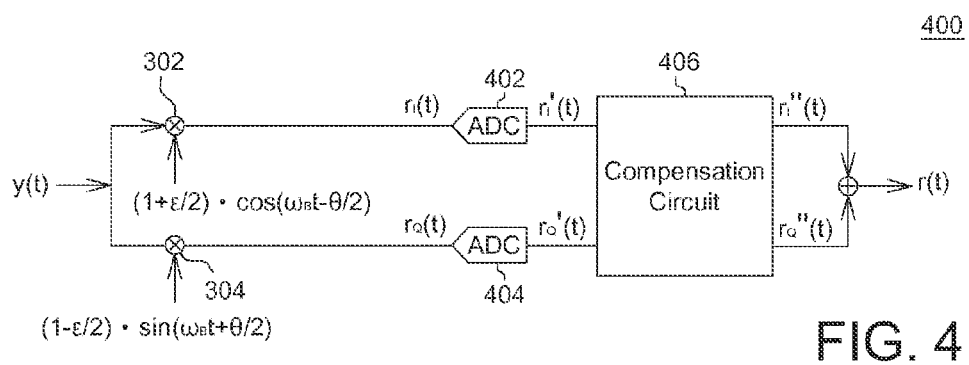
FIG. 4 shows a block diagram of a simplified receiver with the compensation circuit.

In step 208, the in-phase component $r_I(t)$ and the quadrature component $r_Q(t)$ of the signal r(t) corresponding to other input signal y(t) (for example, the signal y(t) inputted afterward when the receiver performs its function normally) is compensated according to the obtained IQ delay mismatch $\Delta t$. Referring to FIG. 4, a block diagram of a simplified receiver with the compensation circuit is shown. The in-phase component $r_I(t)$ and a quadrature component $r_Q(t)$ are converted to digital in-phase component $r_I'(t)$ and digital quadrature component $r_Q'(t)$ by analog to digital circuits (ADC) 402 and 404, respectively, and then the digital in-phase component $r_I'(t)$ and digital quadrature component $r_Q'(t)$ are inputted to the compensation circuit 406. The compensation circuit 406 in the receiver 400 can be accomplished by using a finite impulse response (FIR) filter, which is characterized by matrix h:

$$h = \left[1 - \frac{|\Delta t|}{t_s}, \frac{|\Delta t|}{t_s}\right]; t_s = \frac{1}{f_s}$$

where $t_s$ is the sample period of the ADC 402 and ADC 404 which generating $r'_I(t)$ and $r'_Q(t)$ in the receiver 300, and $f_s$ is the sample frequency of the ADC 402 and ADC 404 which generating $r'_I(t)$ and $r'_Q(t)$ in the receiver 300.

One example of the compensation matrix for the compensation circuit 406 is $$\begin{bmatrix} h_1 & 0 \\ 0 & h_2 \end{bmatrix} \begin{bmatrix} 1 & -\tan\frac{\theta}{2} \\ -\tan\frac{\theta}{2} & 1 \end{bmatrix} \begin{bmatrix} 1 & 0 \\ 0 & \frac{1+\frac{\varepsilon}{2}}{1-\frac{\varepsilon}{2}} \end{bmatrix}$$

Figure 5:
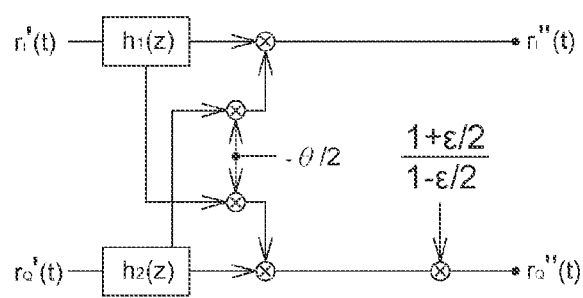
FIG. 5 shows the block diagram of the compensation circuit in FIG. 4.

If $\Delta t<0$, it means $r_I'(t)$ leads $r_Q'(t)$, then h1=h, h2=1. On the other hand, if $\Delta t>0$, it means $r_I'(t)$ lags $r_Q'(t)$, then h1=1, h2=h. The corresponding block diagram of the compensation circuit 406 is shown in FIG. 5.

After the digital in-phase component $r_I'(t)$ and digital quadrature component $r_Q'(t)$ are processed by the compensation circuit 406, the in-phase component $r_I''(t)$ and a quadrature component $r_Q''(t)$ of the signal $r''(t)$ are generated. The signal $r''(t)$ with compensated frequency dependent phase imbalance will improve the performance of the receiver 300.

Since all steps of the method are accomplished in time domain, no Fast Fourier Transform (FFT) is need. Therefore, the circuit complexity of the compensation circuit and the receiver is reduced with low cost and high efficiency. Beside the frequency dependent phase imbalance due to the different lengths of the transmission lines, the frequency dependent phase imbalance caused by other reason, for example, caused by the mismatch of filters that will produce group delay mismatch between in-phase and quadrature phase signals, can also be compensated by using this method.

The Second Embodiment

Figure 6:
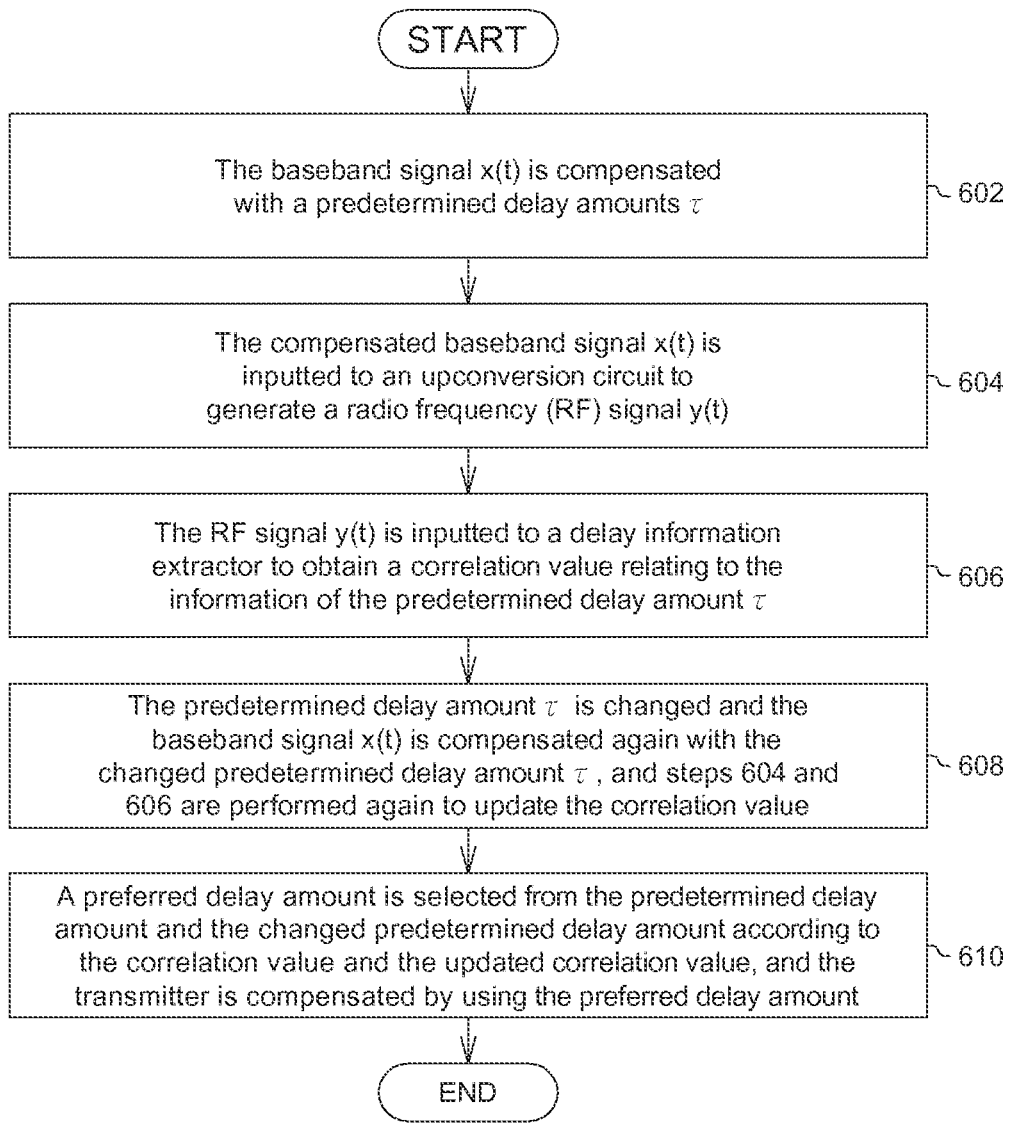
FIG. 6 is the flow chart illustrating a method for compensating the frequency dependent phase imbalance in a transmitter according to one embodiment of the invention.

A method for compensating the frequency dependent phase imbalance in a transmitter according to one embodiment of the invention is described below. The transmitter processing a baseband signal $x(t)$, the baseband signal $x(t)$ has a first component $x_I(t)$ and a second component $x_Q(t)$ which have angular frequency $\omega_B$. The method includes the following steps shown in FIG. 6. In step 602, the baseband signal $x(t)$ is compensated with a predetermined delay amounts $\tau$. In step 604, the compensated baseband signal $x(t)$ is inputted to an upconversion circuit to generate a radio frequency (RF) signal $y(t)$. In step 606, the RF signal $y(t)$ is inputted to a delay information extractor to obtain a correlation value related to the information of the predetermined delay amount $\tau$. In step 608, the predetermined delay amount $\tau$ is changed and the baseband signal $x(t)$ is compensated again with the changed predetermined delay amount $\tau$, and steps 604 and 606 are performed again to update the correlation value. In step 610, a candidate delay amount is selected from the predetermined delay amount and the changed predetermined delay amount according to the correlation value and the updated correlation value, and the transmitter is compensated by using the candidate delay amount (e.g., the closest delay amount).

The method is further explained with one example below. Assume $x(t)=x_I(t)+jx_Q(t)$, in which $$x_I(t)=A_I \cos \omega_B t+B_I$$

$$x_Q(t)=A_Q \cos \omega_B t+B_Q$$

wherein $A_I$ and $A_Q$ are amplitudes and $B_I$ and $B_Q$ are DC values.

Figure 7:
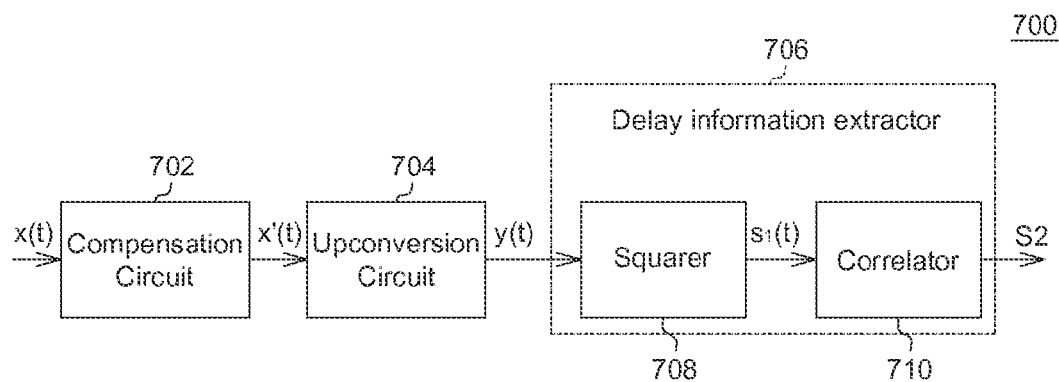
FIG. 7 shows a block diagram of a simplified transmitter used for explaining an example of the embodiment of FIG. 6.

Referring to FIG. 7, a block diagram of a simplified transmitter used for explaining this example of the embodiment is shown. The baseband signal $x(t)$ is firstly inputted to a compensation circuit 702 which performing step 602 and a predetermined delay amounts T is set. For example, the compensation circuit 702 can be accomplished by using a FIR filter, the FIR filter is characterized by matrix h:

$$h = \left[1 - \frac{2\tau}{t_s}, \frac{2\tau}{t_s}\right]; t_s = \frac{1}{f_s}$$

wherein $t_s$ is the sampling period of the baseband signal $x(t)$ in the transmitter 700, and $f_s$ is the sampling frequency of the baseband signal $x(t)$ in the transmitter 700.

One example of the compensation matrix for the compensation circuit 702 is $$\begin{bmatrix} 1 & 0 \\ 0 & \dfrac{1+\dfrac{\varepsilon}{2}}{1-\dfrac{\varepsilon}{2}} \end{bmatrix} \begin{bmatrix} 1 & -\tan\dfrac{\theta}{2} \\ -\tan\dfrac{\theta}{2} & 1 \end{bmatrix} \begin{bmatrix} h_1 & 0 \\ 0 & h_2 \end{bmatrix}$$

Figure 8:
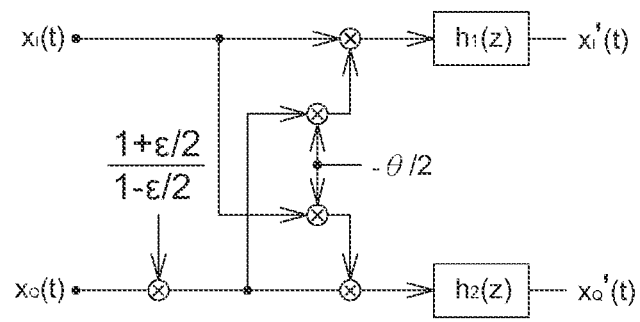
FIG. 8 shows the block diagram of the compensation circuit in FIG. 7.

If $\Delta t<0$, it means $x_I(t)$ leads $x_Q(t)$, then h1=h, h2=1. On the other hand, if $\Delta t>0$, it means $x_I(t)$ lags $x_Q(t)$, then h1=1, h2=h. The corresponding block diagram of the compensation circuit 702 is shown in FIG. 8.

Figure 9:
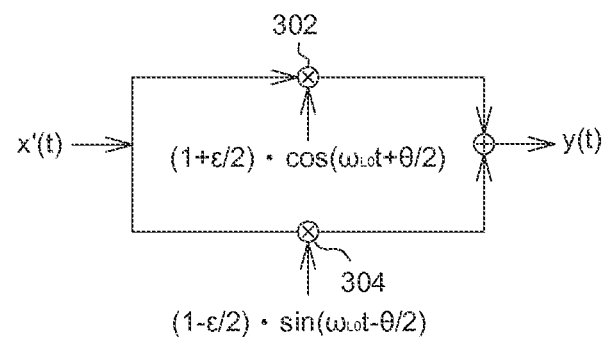
FIG. 9 shows the block diagram of the upconversion circuit in FIG. 7.

After the baseband signal $x(t)$ is compensated with a predetermined delay amounts $\tau$ by the compensation circuit 702, the compensated baseband signal $x'(t)$ is inputted to a upconversion circuit 704 to generate a radio frequency (RF) signal $y(t)$ and step 604 is performed. The corresponding block diagram of the upconversion circuit 704 is shown in FIG. 9, wherein $y(t)=y_I(t)+jy_Q(t)$, where $$\begin{bmatrix} y_I(t) \\ y_Q(t) \end{bmatrix} = \begin{bmatrix} \left(1+\dfrac{\varepsilon}{2}\right)\cos\dfrac{\theta}{2} & \left(1-\dfrac{\varepsilon}{2}\right)\sin\dfrac{\theta}{2} \\ \left(1+\dfrac{\varepsilon}{2}\right)\sin\dfrac{\theta}{2} & \left(1-\dfrac{\varepsilon}{2}\right)\cos\dfrac{\theta}{2} \end{bmatrix} \begin{bmatrix} A_I\cos\omega_B(t+\tau)+B_I \\ A_Q\cos\omega_B(t-\tau)+B_Q \end{bmatrix}$$

The RF signal $y(t)$ is then inputted to the delay information extractor 706 to obtain a correlation value $S_2$ related to the information of the predetermined delay amount $\tau$. In one example, the correlation value $S_2$ is related to the information of the product of the angular frequency $\omega_B$ and the predetermined delay amount $\tau$. Furthermore, the delay information extractor 706, for example, includes a squarer 708 and a correlateor 710. The squarer 708 squares the RF signal $y(t)$. The model of the squarer 708, for example, is $$\frac{1}{2}\{y_I^2 + y_Q^2\}$$

That is, the output signal $S_1(t)$ of the squarer 708 is $$\left(\left(\left(1+\frac{\varepsilon}{2}\right)^2 A_I B_I + \left(1-\frac{\varepsilon}{2}\right)^2 A_Q B_Q\right)M_1 + \left(1-\frac{\varepsilon^2}{4}\right)(A_I B_Q + A_Q B_I)M_3\right)\cos\omega_B t$$
$$- \left(\left(\left(1+\frac{\varepsilon}{2}\right)^2 A_I B_I - \left(1-\frac{\varepsilon}{2}\right)^2 A_Q B_Q\right)M_2 + \left(1-\frac{\varepsilon^2}{4}\right)(A_I B_Q - A_Q B_I)M_4\right)\sin\omega_B t$$

wherein $$\begin{bmatrix} M_1 & M_2 \\ M_3 & M_4 \end{bmatrix} = \begin{bmatrix} \cos\omega_B\tau & \sin\omega_B\tau \\ \dfrac{1}{2}\sin(2\phi)\cos\omega_B\tau & \dfrac{1}{2}\sin(2\phi)\sin\omega_B\tau \end{bmatrix}$$

Since $1>M_1>>M_3>M_2>>M_4$, set $A_I=A_Q=A, B_I=-B_Q=B$, and assume gain and phase imbalance ($\varepsilon$ and $\theta$) has been compensated. The signal $S_1(t)$ is derived as $$S_1(t) = ((A_I B_I + A_Q B_Q)M_1 + (A_I B_Q + A_Q B_I)M_3)\cos\omega_B t -$$
$$((A_I B_I - A_Q B_Q)M_2 + (A_I B_Q - A_Q B_I)M_4)\sin\omega_B t$$
$$= [(A_I B_I + A_Q B_Q)\cos\omega_B\tau]\cos\omega_B t + [(A_I B_I - A_Q B_Q)\sin\omega_B\tau]\sin\omega_B t$$
$$= 2AB\sin\omega_B\tau\sin\omega_B t$$

Figure 10:
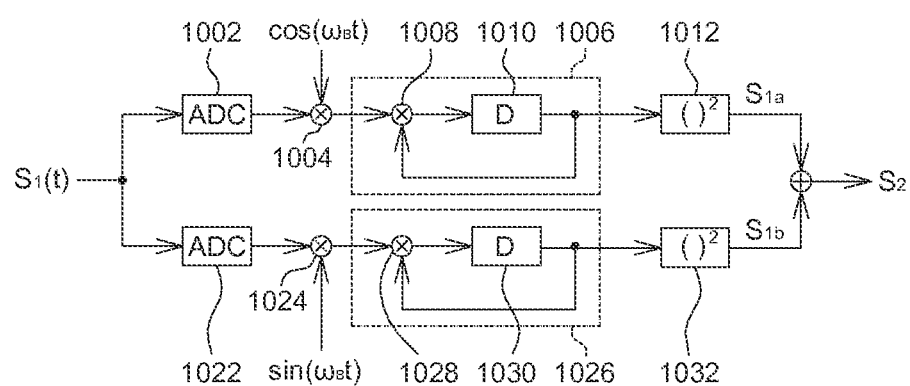
FIG. 10 shows the block diagram of one example of the correlateor in FIG. 7.

The signal $S_1(t)$ is then inputted to the correlator 710, and the correlator 710 performs correlation on the signal $S_1(t)$ by using a sine wave signal and a cosine wave signal both having the angular frequency $\omega_B$, and the correlator 710 generates the correlation value $S_2$ accordingly. The corresponding block diagram of one example of the correlator 710 is shown in FIG. 10. The signal $S_1(t)$ is converted to digital signal by ADC 1002, and then is multiplied with cos $\omega_B t$ by the multiplier 1004. The result is then processed by a averager 1006 which is implemented by a adder 1008 and a delay 1010. The output of the averager 1006 is squared by squarer 1012 to generate value $S_{1a}$. The signal $S_1(t)$ is also converted to digital signal by ADC 1022, and then is multiplied with sin $\omega_B t$ by the multiplier 1024. The result is then processed by a averager 1026 which is implemented by a adder 1028 and a delay 1030. The output of the averager 1026 is squared by squarer 1032 to generate value $S_{1b}$. The correlation value $S_2$ is obtained by adding the value $S_{1a}$ and $S_{1b}$. In this example, the correlation value $S_2$ is obtained as:

$$S_2 = 4A^2B^2 \sin^2 \omega_B \tau$$

After step 606, step 608 is preformed to change the value of delay amount (the changed delay amount is denoted as $\tau^{(1)}$) and the baseband signal $x(t)$ is inputted to compensation circuit 702 again to compensate $x(t)$ again by using the changed delay amount $\tau^{(1)}$. The steps 604 and 606 are performed again with updated compensated baseband signal $x'(t)$. A updated correlation value (the updated correlation value is denoted as $S_2^{(1)}$) is accordingly generated by the delay information extractor 706. In step 610, a candidate delay amount $\tau'$ is selected from the predetermined delay amount $\tau$ and the changed delay amount is denoted as $\tau^{(1)}$ according to the correlation value $S_2$ and the updated correlation value $S_2^{(1)}$. The transmitter will be compensated by using the candidate delay amount $\tau'$. That is, after the method is completed, other input signal of the transmitter will be compensated by compensation circuit 702 by using the candidate delay amount $\tau'$.

Since the delay amount corresponding to lower correlation value is close to value of the actual frequency dependent phase imbalance between $x_I(t)$ and $x_Q(t)$ when $x_I(t)$ and $x_Q(t)$ is transmitted in the transmitter, it is preferred that the candidate delay amount $\tau'$ corresponding to the smaller one of the correlation value $S_2$ and the updated correlation value $S_2^{(1)}$ is chosen as the delay amount for the transmitter. That is, if the updated correlation value $S_2^{(1)}$ is smaller than the correlation value $S_2$, then the candidate delay amount $\tau'$ and is chosen as the delay amount for the transmitter.

In other example of the embodiment, more than two delay amounts $\tau$ can be chosen to perform steps 602 to 610, and one among these delay amounts $\tau$ which corresponding to the smallest correlation value $S_2$ can be chosen as the candidate delay amount $\tau'$, which is used to compensate the input signal of transmitter when the transmitter operates in normal state.

All steps 602 to 610 above of the method can be accomplished in time domain. Therefore, FFT is not necessary for this method and the circuit complexity is reduced with low cost and high efficiency. Beside the frequency dependent phase imbalance due to the different lengths of the transmission line, the frequency dependent phase imbalance caused by other reason, for example, caused by the mismatch of filters or caused by group delay of signal, can also be compensated by using this method.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for compensating the frequency dependent phase imbalance in a receiver, the receiver downconverting an input signal to generate a signal r(t), the signal r(t) having an in-phase component $r_I(t)$ and a quadrature component $r_Q(t)$, the method comprising:
   applying a first test signal with a first carrier frequency as the input signal of the receiver to obtain a first phase imbalance between the in-phase component and the quadrature component of the signal r(t) corresponding to the first test signal;
   applying a second test signal with a second carrier frequency as the input signal of the receiver to obtain a second phase imbalance between the in-phase component and the quadrature component of the signal r(t) corresponding to the second test signal;
   obtaining a IQ delay mismatch $\Delta t$ of the receiver according to the difference of the second phase imbalance and the first phase imbalance and the difference of the second carrier frequency and the first carrier frequency; and
   compensating the in-phase component $r_I(t)$ and the quadrature component $r_Q(t)$ of the signal r(t) corresponding to other input signal according to the obtained IQ delay mismatch $\Delta t$;
   wherein the second carrier frequency is different from the first carrier frequency.

2. The method according to claim 1, wherein the IQ delay mismatch $\Delta t$ is obtained according to an equation:

$$\Delta t = \frac{\phi_2 - \phi_1}{360° \cdot (f_{B2} - f_{B1})}$$

wherein $f_{B1}$ and $f_{B2}$ represent the first carrier frequency and the second carrier frequency, respectively, and $\phi_1$ and $\phi_2$ represent the first phase imbalance and the second phase imbalance, respectively.

3. The method according to claim 1, wherein the step of compensating the IQ delay mismatch of the in-phase component I(t) and the quadrature component Q(t) of the signal r(t) is accomplished by using a finite impulse response (FIR) filter.

4. The method according to claim 3, wherein the FIR filter is characterized by matrix h:

$$h = \left[1 - \frac{|\Delta t|}{t_s}, \frac{|\Delta t|}{t_s}\right]; t_s = \frac{1}{f_s}$$

wherein, $t_s$ is a sampling period used to generate the in-phase component $r_I(t)$ and the quadrature component $r_Q(t)$ in the receiver, and $f_s$ is a sampling frequency used to generate the in-phase component $r_I(t)$ and the quadrature component $r_Q(t)$ in the receiver.

5. The method according to claim 1, wherein all steps of the method are accomplished in time domain.

6. An apparatus for compensating the frequency dependent phase imbalance in a receiver, the receiver downconverting an input signal to generate a signal r(t), the signal r(t)

having an in-phase component $r_I(t)$ and a quadrature component $r_Q(t)$, the apparatus comprising:

means for applying a first test signal with a first carrier frequency as the input signal of the receiver to obtain a first phase imbalance between the in-phase component and the quadrature component of the signal r(t) corresponding to the first test signal;

means for applying a second test signal with a second carrier frequency as the input signal of the receiver to obtain a second phase imbalance between the in-phase component and the quadrature component of the signal r(t) corresponding to the second test signal;

means for obtaining a IQ delay mismatch Δt of the receiver according to the difference of the second phase imbalance and the first phase imbalance and the difference of the second carrier frequency and the first carrier frequency; and means for compensating the in-phase component $r_I(t)$ and the quadrature component $r_Q(t)$ of the signal r(t) corresponding to other input signal according to the obtained IQ delay mismatch Δt;

wherein the second carrier frequency is different from the first carrier frequency.

7. The apparatus according to claim 6, wherein the IQ delay mismatch Δt is obtained according to an equation:

$$\Delta t = \frac{\phi_2 - \phi_1}{360° \cdot (f_{B2} - f_{B1})}$$

wherein $f_{B1}$ and $f_{B2}$ represent the first carrier frequency and the second carrier frequency, respectively, and $\phi_1$ and $\phi_2$ represent the first phase imbalance and the second phase imbalance, respectively.

8. The apparatus according to claim 6, wherein means for compensating the IQ delay mismatch of the in-phase component I(t) and the quadrature component Q(t) of the signal r(t) is accomplished by using a finite impulse response (FIR) filter.

9. The apparatus according to claim 8, wherein the FIR filter is characterized by matrix h:

$$h = \left[1 - \frac{|\Delta t|}{t_s}, \frac{|\Delta t|}{t_s}\right]; t_s = \frac{1}{f_s}$$

wherein, $t_s$ is a sampling period used to generate the in-phase component $r_I(t)$ and the quadrature component $r_Q(t)$ in the receiver, and $f_s$ is a sampling frequency used to generate the in-phase component $r_I(t)$ and the quadrature component $r_Q(t)$ in the receiver.

10. The apparatus according to claim 6, wherein the apparatus are accomplished in time domain.

* * * * *